United States Patent [19]

Gillchriest

[11] 3,925,432

[45] Dec. 9, 1975

[54] BORONATED TETRACYCLINE COMPOUNDS

[75] Inventor: William C. Gillchriest, Los Angeles, Calif.

[73] Assignee: Smyth, Roston & Pavitt, Los Angeles, Calif.

[22] Filed: Mar. 7, 1972

[21] Appl. No.: 232,620

[52] U.S. Cl. .......... 260/429.7; 260/429.9; 260/431; 260/438.1; 260/438.5 R; 260/439 R; 260/448 R; 260/578; 260/583 A; 260/583 H; 424/227; 99/DIG. 9; 426/133; 426/151; 426/335
[51] Int. Cl.² ...................................... C07C 103/19
[58] Field of Search ......... 260/559 AT, 431, 448 R, 260/551 B, 429.7, 429.9, 438.1, 438.5, 439 R

[56] References Cited
UNITED STATES PATENTS 3,338,963   8/1967   Petisi et al. .................... 260/559 AT

*Primary Examiner*—Richard J. Gallagher
*Assistant Examiner*—Anne Marie T. Tighe
*Attorney, Agent, or Firm*—George F. Smyth

[57] ABSTRACT

Boronated tetracycline compounds in which a polymeric boron-amino group is substituted on the 7-position of tetracycline or anhydrotetracycline and metal complexes of these compounds. Process for forming the above compounds by reaction of 7-chloro tetracycline or 7-chloro anhydrotetracycline with a polymeric boron compound having a primary amine substituent group.

10 Claims, No Drawings

BORONATED TETRACYCLINE COMPOUNDS

Tetracycline and anhydrotetracycline are well known compounds which have been extensively studied by various researchers. The present invention relates to novel tetracycline and anhydrotetracycline derivatives in which a polymeric boron-amino group is substituted on the 7-position of either tetracycline or anhydrotetracycline.

The compounds of the present invention may be represented by the following generic formulae.

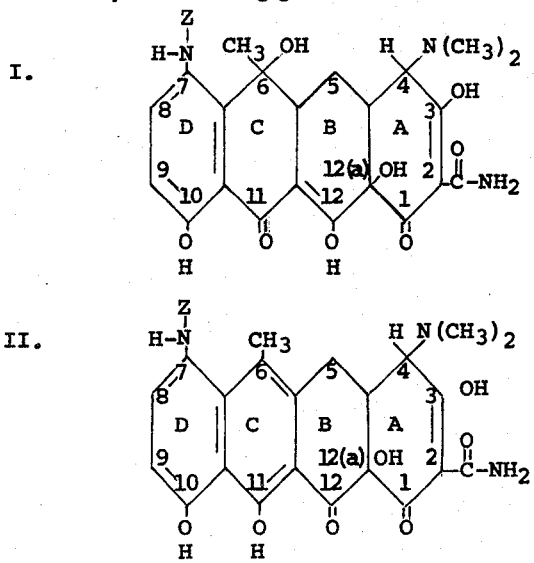

In the above formulae, the positions of the carbon atoms have been numbered and the rings have been identified by the letters A, B, C and D. The above system of numbering the carbon atoms and the rings in tetracycline and anhydrotetracycline is the standard system of nomenclature used in referring to these compounds and their derivatives.

The term "Z" in the above formulae refers to a polymeric boron-containing substituent group having the general formula:

$$- A - R$$

in which A represents
  methylene ($-CH_2-$),
  ethylene ($-C_2H_4-$) or
  phenylene ($-C_6H_4-$), and R represents a carborano or dodecacarborano radical having the respective structures:

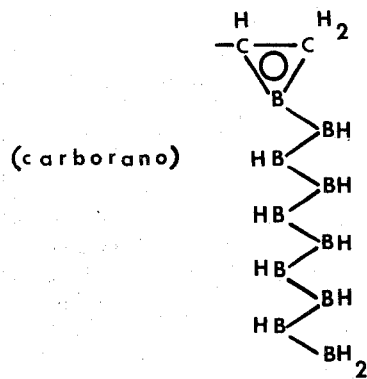

(carborano)

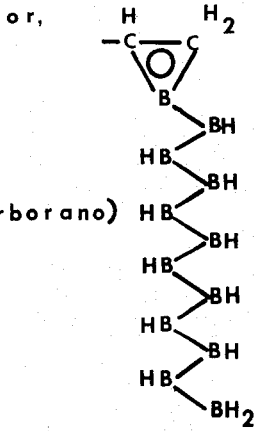

(dodecacarborano)

In forming the compounds of the present invention, a polymeric boron-primary amine compound, such as 1-amino methyl carborane, is reacted with either 7-chlorotetracycline or 7-chloro anhydrotetracycline. The polymeric boron-primary amine reactant may be represented by the formula:

$$Z - NH_2$$

in which Z has the same meaning as described previously.

The reactant materials, $Z-NH_2$, may be prepared by reaction of a compound

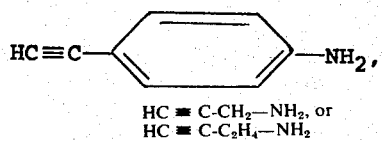

$HC \equiv C-CH_2-NH_2$, or
$HC \equiv C-C_2H_4-NH_2$ with decaborane or dodecaborane. The bridging groups between the primary amine group and the acetyleno group in the above listed reactants correspond to the definition of "A" as previously set forth. If A is a phenylene group, it may be substituted with lower alkyl groups or groups such $-NO_2$, $-OH$, or $-SO_3$. The reactant materials, $Z-NH_2$, may be prepared by reaction in a non aqueous polar solvent such as acetonitrile.

The reaction of a compound $Z-NH_2$ with 7-chloro tetracycline or 7-chloro anhydrotetracycline is carried out in the presence of nitrogen or any other inert gas such as argon, krypton, helium or the like in order to exclude the presence of oxygen. The reaction temperature is not critical and may, for example, range from about room temperature or about 25°C. up to the boiling point of the solvent.

The reaction is conducted in an organic solvent which does not react with the reactants, eg., toluene, benzene, etc., and is preferably conducted with agitation to insure a more even reaction rate. The reaction time is not critical and I have found a convenient reaction time to be in the order of about 18 hours or more. Following completion of the reaction, the reaction mixture is cooled to about room temperature, after which the reaction vessel may be sealed and placed overnight in a refrigerator. After cooling of the reaction mixture to decrease the solubility of the reaction product in the reaction solvent, the product may be separated by any convenient means such as filtration using, for example, Whatman filter paper or a Beuchner filter. After separation of the reaction product, the product may be dried by vacuum desiccation under a protective atmosphere of nitrogen or an inert gas.

My products, as defined above, are very soluble in water. Thus, it is preferable that water not be present since its presence makes the separation more difficult.

My invention also includes the metal complexes of the compounds defined in formulae I and II, above. It is well known that tetracycline and anhydrotetracycline form certain metal complexes in which the metal atom is bonded through a chelate structure to tetracycline or anhydrotetracycline. Literature references which describe metal complexes of this type are the articles by A. Albert and C. W. Rees in Nature, Volume 172, page 201 (1953) and Volume 177, page 433 (1956). Thus, my invention includes the metal complexes formed by the cations $Ca^{++}$, $Ni^{++}$, $Zn^{++}$, $Mn^{++}$, $Fe^{+++}$, $Al^{+++}$, $Cr^{+++}$, $Sn^{++}$, $Co^{++}$, or $Hg^{++}$ with my compounds as defined in formulae I and II. The metal complexes may be readily formed by reacting my compounds with a water soluble salt of any of the aforementioned metal ions in an aqueous medium. Typical salts which are water soluble to some degree and may be employed in this reaction, are: ferric chloride, cupric chloride, manganous chloride, chromic chloride, mercuric chloride, cobaltous chloride, nickel chloride or nickel chloride hexahydrate, zinc chloride, stannous chloride and aluminum chloride.

The reaction to form the metal complex may be conducted in an aqueous medium under mildly basic pH conditions such as about 7.5 to about 8.0. The reaction goes readily at about room temperature and preferably the reaction mixture is agitated. The quantities of the reactants are not critical. However, the stoichiometry of the reaction requires a molar reactant ratio of 1 to 1 and, thus, the reactants are generally employed in equimolar amounts.

Following the formation of the metal complexes, they may be separated from the reaction mixture. Any of several methods of separation may be used to separate off the metal complexes. The reaction mixture may be frozen and the moisture removed by sublimation under vacuum. Also, the complexes may be salted out by the addition of an organic solvent such as normal hexane, dioxane, etc. A still further means of separation is to adsorb the complex onto a calcium or aluminum phosphate gel, as will be described subsequently, with controlled pH and subsequent ligand elution.

To further illustrate my invention, there are presented the following examples in which all parts and percentages are by weight unless otherwise indicated.

EXAMPLE I

To 11.35 grams of 7-chlorotetracycline in solution in toluene were added 1.87 grams of amino methyl carborane. The solution was then heated at reflux for 18 hours under a protective atmosphere of nitrogen. Following this, the reaction mixture was cooled to about room temperature and the reaction vessel was stoppered and cooled overnight in a refrigerator. The yellow precipitate was then separated from the reaction mixture by filtration to provide, in good yield, the compound 7-(carboranomethyleneamino) tetracycline.

When Example I is repeated utilizing 7-chloro anhydrotetracycline in lieu of 7-chlorotetracycline, good yields of the compound 7-(carboranomethyleneamino) anhydrotetracycline are obtained. Similarly, when the compounds aminophenyl dodecacarborane or aminoethyl dodecacarborane are substituted for amino methyl carborane in the above reaction, the compounds 7-(dodecacarboranophenyleneamino) tetracycline and 7-(dodecacarboranoethyleneamino) tetracycline are obtained in good yield.

EXAMPLE II

In proving the structure of my compounds, a compound, such as 7-(carboranomethyleneamino) tetracycline was added to a calcium phosphate $[Ca_2(PO_4)_3]$ gel in the form of an aqueous solution at a pH of about 7.0. After addition of the aqueous solution containing 7-(carboranomethyleneamino) tetracycline to the gel, the gel was washed with distilled water until the washings tested negative with respect to the presence of boron. A convenient test for determining the presence or absence of boron in the washings is set forth in the publication by Kaczmarczy, K. H., Messer, J. R., and Peirce, C. E. in Analytical Chemistry, 43,271–272(1971) entitled "A Rapid Method for Determination of Boron in Biological Materials." It was found that at least about 5 washings were required before the washings tested negative to the presence of boron. Following this, a 0.01 molar solution of ethylene diamine tetraacetic acid at a pH of about 7.25 was added to the gel. It was found that the ethylene diamine tetraacetic acid displaced my compound from the gel to provide the compound in the ethylene diamine tetraacetic acid solution. The particular compound 7-(carboranomethyleneamino) tetracycline has a distinct yellow color. Thus, the displacement of this compound by the ethylene diamine tetraacetic acid solution resulted in the removal of the yellow coloration from the gel and its transfer to the ethylene diamine tetraacetic acid solution.

EXAMPLE III

Calcium phosphate gels have a definite affinity for tetracycline, anhydrotetracycline, and their derivatives. In demonstrating this, equimolar amounts of calcium chloride and potassium acid phosphate were added to water contained in a beaker. To 10 grams of the thus formed calcium phosphate gel were added 10 grams of tetracycline in an aqueous medium to produce bonding of the tetracycline to the calcium phosphate gel. Aliquots of the thus treated gel were then added to 15-milliliter centrifuge tubes, balanced on an Ohaus balance. Harvard trip balances were used which had a capacity up to 2000 grams and the calcium phosphate-tetracycline complex was then spun and the supernatant liquid was poured into a collecting 2-liter Erlenmeyer flask. The calcium phosphate-tetracycline gel was then washed repeatedly with a 0.001 molar solution of potassium acid phosphate buffered to a pH of 7.25 until the calcium phosphate gel had lost all of the available tetracycline to the supernatant liquid. The tetracycline in the supernatant liquid was checked by use of an Aminco Spectrophosphophotofluorimeter and also by the use of a U.V. Spectrophotometer. When it was found, by these measurements, that the tetracycline was clearly complexed to the calcium phosphate gel and not exchanging with the supernatant liquid, the calcium phosphate gel was resuspended in distilled water and repeatedly washed with distilled water in order to remove the potassium acid phosphate. After subjecting the gel to 10 repeated washings with the distilled water, it was found that the calcium phosphate gel still contained tetracycline. The calcium phosphate-tetracycline gel was then washed with either a 0.01 molar solution of ethylene diamine tetraacetic acid (EDTA) or a 0.01 molar solution of ethylene glycol tetraacetic acid (EGTA). It was observed that either the EDTA solution or the EGTA solution displaced the tetracycline from the calcium phosphate gel such that the tetracycline was concentrated in the supernatant eluting liquid.

When Example III is repeated utilizing anhydrotetracycline in lieu of tetracycline, the same results are obtained, namely, the anhydrotetracycline is tightly bound to the calcium phosphate gel but may be displaced therefrom by eluting with ethylene diamine tetraacetic acid or ethylene glycol tetraacetic acid. In separating tetracycline, anhydrotetracycline, or derivatives of either from water, an aluminum phosphate or an iron phosphate gel may be employed in lieu of the calcium phosphate gel.

EXAMPLE IV

Equimolar amounts of the product of Example I and ferric chloride were placed in solution in water containing a small quantity of potassium hydroxide in an amount sufficient to produce a mildly basic condition, i.e., a pH of about 7.5 to about 8.0. The reaction mixture was agitated at room temperature under a protective atmosphere of nitrogen for about 18 hours. The formation of the iron complex was indicated by a color change in the reaction mixture from yellow to red. After completion of the reaction, the reaction product, the iron complex of 7-(carboranomethyleneamino) tetracycline was separated from the reaction mixture by adding the reaction mixture to a calcium phosphate gel in the manner described previously in Example III. After several washings of the gel with distilled water, the reaction product was displaced from the gel by the addition thereto of a solution of ethylene diamine tetraacetic acid. Forrowing this, the supernatant was cooled to precipitate the iron complex which was then separated by filtration.

When Example IV is repeated utilizing $CuCl_2$, $ZnSO_4$, $MnCl_2$ or $CoCl_2$ in lieu of ferric chloride, the corresponding copper, zinc, manganese, and cobalt complexes are obtained.

Tetracycline and anhydrotetracycline compounds are well known food preservatives. In such use, they are added in a small amount such as 7 or 10 parts per million (ppm) of the tetracycline or anhydrotetracycline moiety. Inasmuch as my compounds and the metal complexes thereof, as described in the foregoing specification, contain a tetracycline or an anhydrotetracycline moiety, my compounds and their metal complexes are useful as food preservatives. When so used, they are added at a a low concentration level, such as about 10 ppm or less, to the food product.

A further use for my compounds and their metal complexes is in the sterilization of milk. In this use, my compounds or their metal complexes are added to milk at a low concentration level such as about 10 ppm or less and the milk is then subjected to neutron bombardment. The neutrons combine with $B_5^{10}$ atoms in my compounds or their metal complexes to yield $Li_3^7$ atoms and an $\alpha$-particle having an energy of 2.5 megavolts (Mev). The $\alpha$-particle loses its energy to form $He_2^4$ with the energy from the $\alpha$-particle providing sterilization of the milk. This method of sterilization may be employed in situations where it would be undesirable or impractical to use heat in sterilizing the milk or milk product.

The compounds of my invention and the metal complexes thereof, as described previously, are useful as food preservatives, having the same basic ring structure as tetracycline or anhydrotetracycline. My compounds and their metal complexes are surprisingly much more soluble in aqueous media than the parent compounds tetracycline and anhydrotetracycline. It was found that my compounds and their metal salts may be as much as four times as soluble in an aqueous medium than the parent tetracycline or anhydrotetracycline. This increased solubility will make my compounds and their metal complexes particularly suitable for use applications as food preservatives in which either the food product is embodied in an aqueous medium or the preservative is added in the form of an aqueous solution. By virtue of their increased solubility, my compounds may be added in a more concentrated form in an aqueous medium or may be added to a food product which is embodied in a form that contains only a small quantity of water. The increased solubility of my compounds and their metal complexes in water insures that the additive will be properly distributed throughout the food product so as to more uniformly preserve the product.

Boron occurs in nature in the form of two isotopes, one having an atomic weight of 10 with 5 protons in the nucleus, and one having an atomic weight of 11 with 5 protons in the nucleus. Approximately 20 percent of the boron found in nature is in the form of $B_5^{10}$ while 80 percent is in the form of $B_5^{11}$. Thus, my compounds and the metal complexes thereof include compounds in which all of the boron that is present is in the from of $B_5^{10}$, or all $B_5^{11}$, or a mixture of these such as the naturally occurring mixture with an atomic weight of 10.83.

In all of the experimental work referred to in the foregoing specification, it should be understood that a protective atmosphere, such as nitrogen or a rare gas, is utilized. Both tetracycline and anhydrotetracycline are oxidatively degraded by oxygen. Thus, in dealing with either of these materials or their derivatives, it is necessary that steps be taken to exclude the presence of oxygen.

In experimental work which is related to that described previously, I have found that tetracycline, anhydrotetracycline, or any of the tetracycline or anhydrotetracycline analogs may be reacted with a transition metal salt in an aqueous medium at a pH which is neutral or slightly basic, such as about 7.5 to about 8.0, and a polymeric boron compound containing a thiol group to produce novel structures. In these structures, the polymeric boron group is bonded through a sulfur bridge to the transition metal atom, which is in turn bonded to the tetracycline or anhydrotetracycline ring structure through chelate bonding. The suitable metals include all of the transitional metals previously set forth in this specification. In this manner, I am able to introduce a polymeric boron group into tetracycline or anhydrotetracycline compounds.

Unreacted 7-chlorotetracycline or 7-chloroanhydrotetracycline which may be copresent with my products can be removed by dissolving the product in water and precipitating the 7-chlorotetracycline or 7-chloroanhydrotetracycline through addition of magnesium ions. The magnesium ions may be added in the form of a soluble magnesium salt such as magnesium chloride or magnesium nitrate at a concentration level sufficient to react with the 7-chlorotetracycline or 7-chloroanhydrotetracycline in solution. Conveniently the magnesium salt may be added at a level of about one-half mole or higher for each mole of the product. After precipitation of the 7-chlorotetracycline or 7-chloroanhydrotetracycline, the precipitate may be separated off by filtration and the liquid may be cooled to precipitate the product in the manner described previously.

I claim:

1. A compound in which a substituent group having the structure

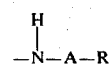

is bonded to the 7-position of tetracycline or anhydrotetracycline, and
wherein A is methylene, ethylene or phenylene and R is carborano or dodecacarborano.

2. The compounds of claim 1 wherein A is methylene.

3. The compound 7-(carboranomethyleneamino) tetracycline.

4. A metal complex of a compound in which a substituent group having the structure

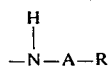

is bonded to the 7-position of tetracycline or anhydrotetracycline with A being methylene, ethylene or phenylene and R being carborano or dodecacarborano; said metal being $Ca^{++}$, $Ni^{++}$, $Zn^{++}$, $Mn^{++}$, $Fe^{+++}$, $Al^{+++}$, $Cr^{+++}$, $Sn^{++}$, $Co^{++}$ or $Hg^{++}$;
said metal being complexed with the ring structure of tetracycline or anhydrotetracycline, and
the molar ratio of said metal to said compound containing the tetracycline or anhydrotetracycline ring being 1:1.

5. A method of preparing tetracycline or anhydrotetracycline compounds having bonded to the 7-position thereof a substituent group having the structure

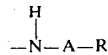

wherein A is methylene, ethylene or phenylene and R is carborano or dodecacarborano, said method comprising the step of reacting 7-chloro tetracycline or 7-chloro anhydrotetracyline with a compound having the structure
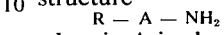
wherein A is phenylene, methylene or ethylene, and R is carborano or dodecacarborano, said reaction being carried out in the presence of nitrogen or an inert gas and an organic solvent that is unreactive with the reactants.

6. The method of claim 5 wherein said organic solvent is toluene.

7. The method of claim 5 wherein A is methylene.

8. The method of claim 5 wherein said reaction is carried out with agitation of the reaction mixture.

9. The method of claim 5 including the additional step of reacting said 7-substituted tetracycline or anhydrotetracycline compound with a water soluble salt having a $Cu^{++}$, $Ni^{++}$, $Zn^{++}$, $Mn^{++}$, $Fe^{+++}$, $Al^{+++}$, $Cr^{+++}$, $Sn^{++}$, $Co^{++}$ or $Hg^{++}$ cation in an aqueous reaction medium under mildly basic pH conditions in the presence of nitrogen or an inert gas.

10. The method of claim 9 wherein said mildly basic pH conditions are a pH of about 7.5 to about 8.0.

* * * * *